United States Patent
Peters

[15] 3,700,321
[45] Oct. 24, 1972

[54] MICROFILM VIEWER
[72] Inventor: Arnis E. Peters, La Crosse, Wis.
[73] Assignee: Micro 8 Company
[22] Filed: Nov. 18, 1970
[21] Appl. No.: 90,514

[52] U.S. Cl. .................................................353/26
[51] Int. Cl. ............353 78, G03b 23/12, G03b 21/28
[58] Field of Search................353/25, 26, 27, 74–78, 353/100, 101

[56] References Cited

UNITED STATES PATENTS

| | | | |
|---|---|---|---|
| 3,319,517 | 5/1967 | Rondas | 353/78 |
| 3,498,707 | 3/1970 | Allen | 353/77 |
| 1,987,710 | 1/1935 | Robbins | 353/13 |
| 3,531,575 | 9/1971 | Kobler | 274/4 C |

Primary Examiner—Leonard Forman
Assistant Examiner—A. J. Mirabito
Attorney—Lettvin & Gerstman

[57] ABSTRACT

A portable, compact viewer is provided for illuminating, enlarging and viewing microphotograph frames that are carrier on a film strip pre-packaged in a cassette. An angled stand for the viewer carries one of the mirrors used in projecting the illuminated and enlarged image and provides shield means against random light entering the viewer. Simplified means are provided for selectively holding a film-containing cassette in proper optical position on the viewer and for releasing the cassette for focusing the lens means and for transporting the film in the cassette selectively in opposite directions, all without possibility of damage to the microphotograph-bearing portion of the film strip.

14 Claims, 13 Drawing Figures

Patented Oct. 24, 1972

INVENTOR
Arnis E. Peters
BY Letvin & Gustman
ATTORNEYS

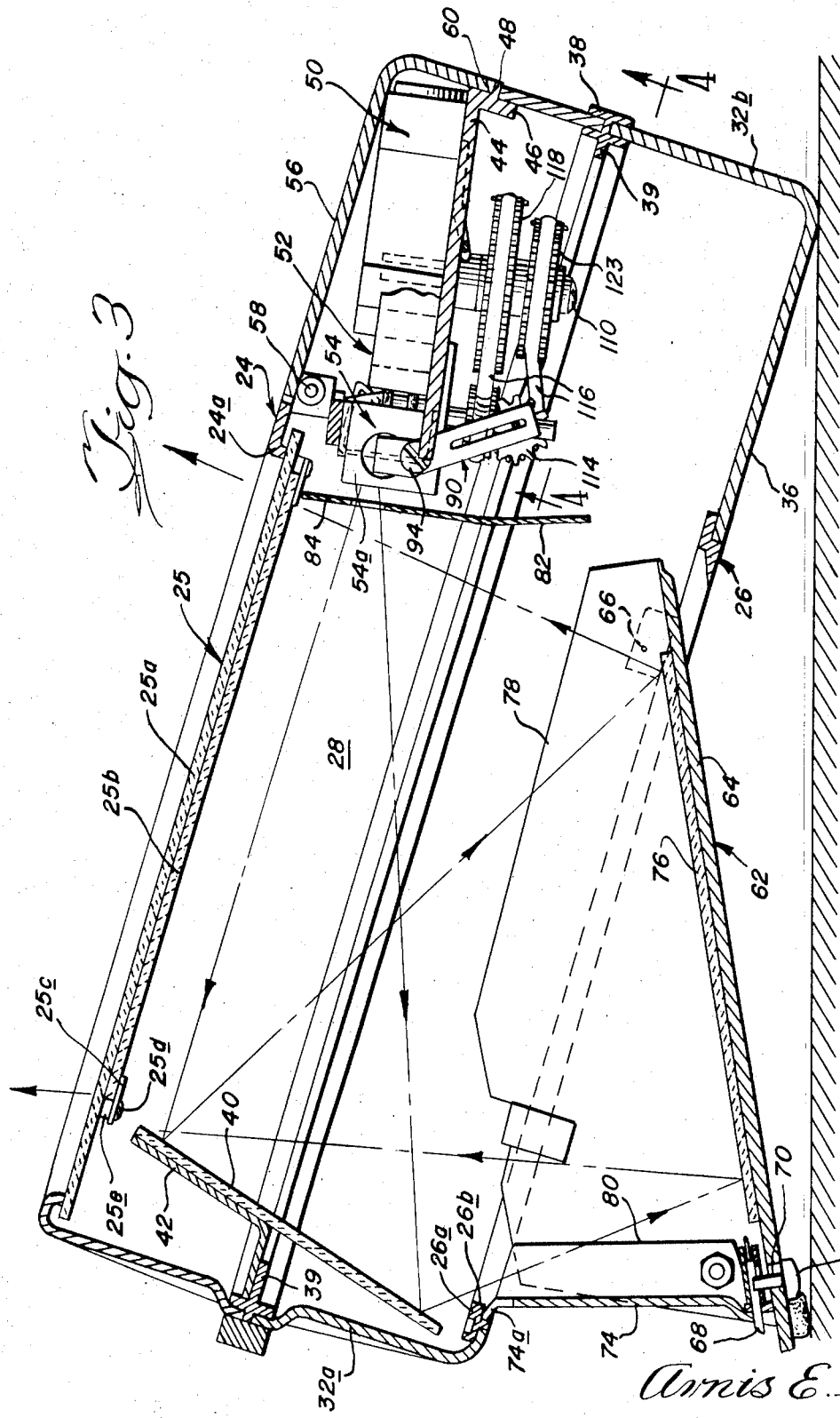

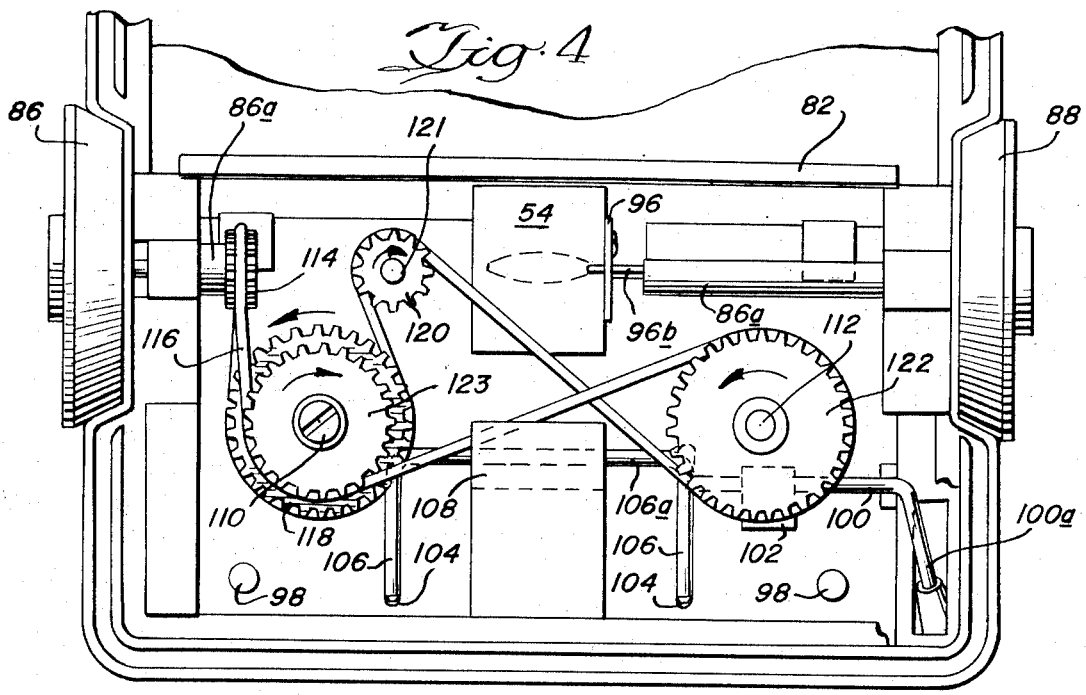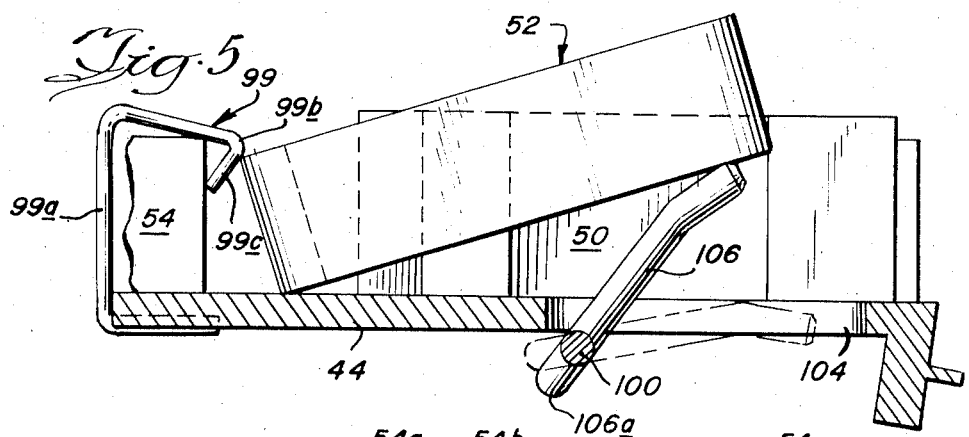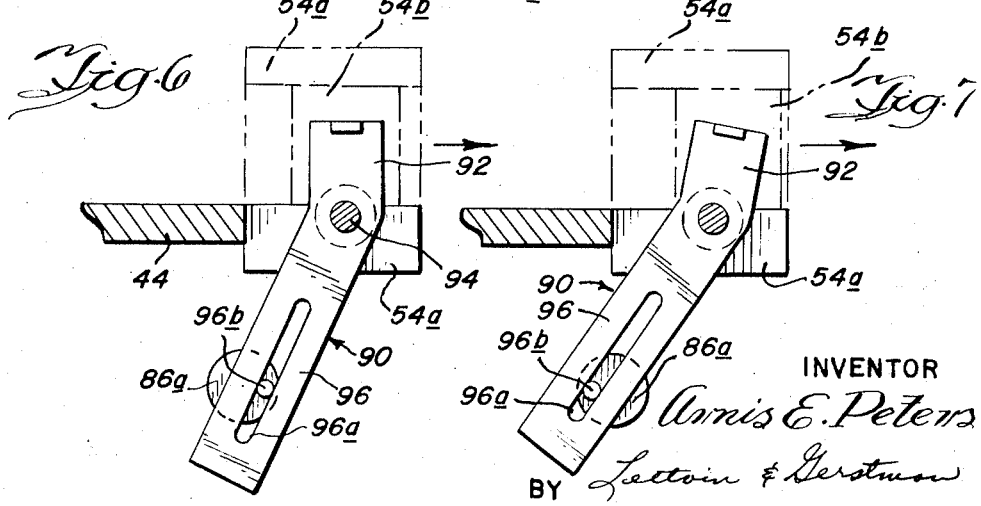

Patented Oct. 24, 1972
3,700,321
4 Sheets-Sheet 4
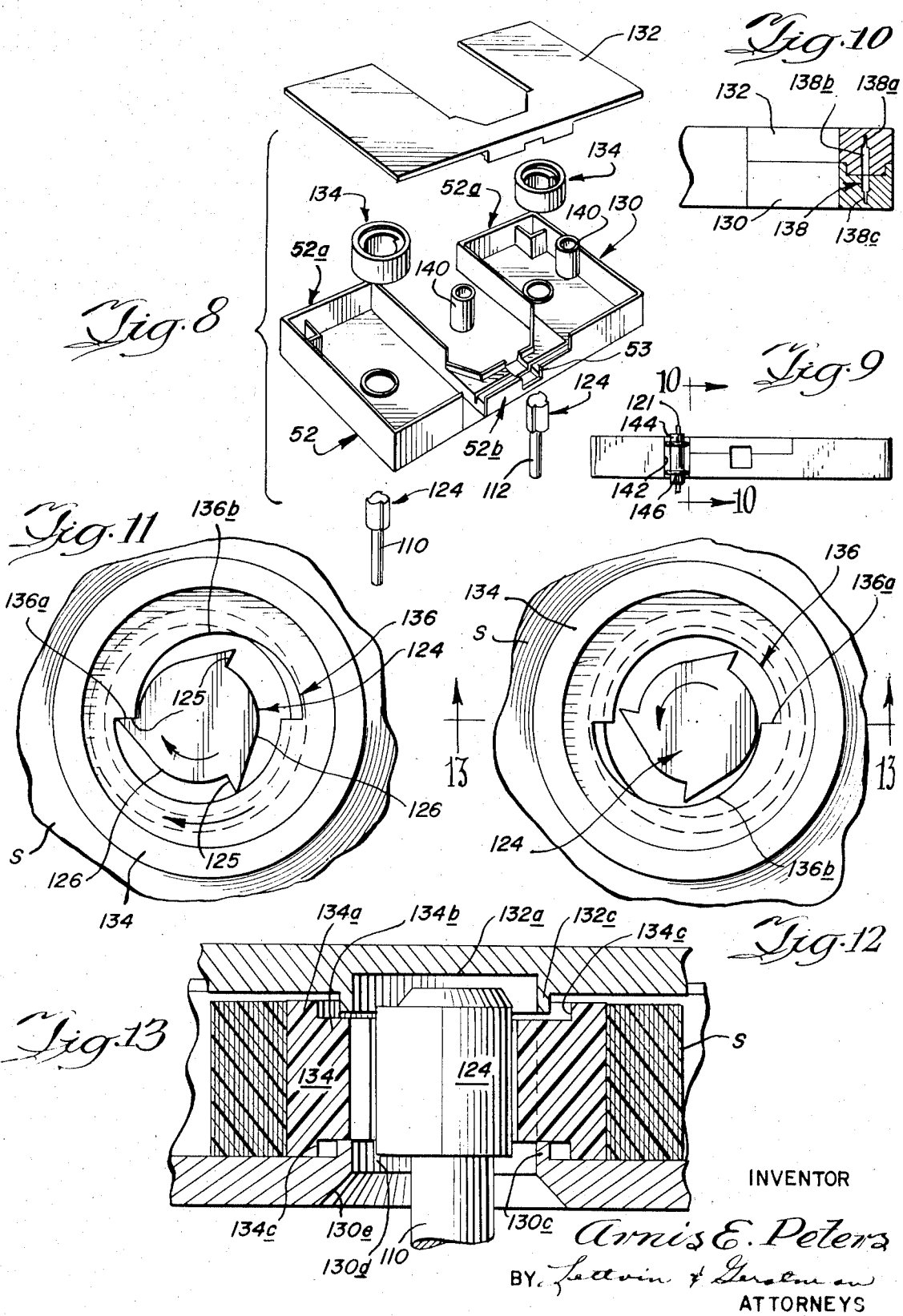
INVENTOR
Arnis E. Peters
BY Lettvin & Gerstman
ATTORNEYS

MICROFILM VIEWER

BACKGROUND OF THE INVENTION

The use of microphotographs, printed on cards or on film-like cards known as fiche, and viewers for illuminating, enlarging and projecting selected frames of such cards or fiches onto a viewing screen are well known in the art. The prior art also informs one that in order to properly enlarge a microphotograph to a size for reading, the microphotograph must be located precisely at an attitude perpendicular to the optical axis of the optical system of the viewer. Scratching or damage to the microphotograph can seriously interfere with the projected image because of the requirement of substantial optical multiplying of size by the viewer. Because of the foregoing, viewers have heretofore been rather large. bulky and complex and required precise construction, resulting in a rather expensive instrument.

The use of cassettes for storage of taped sound recordings is also known in the prior art. Such cassette-stored tapes must present a length of flexible tape that is to be engaged by a head either for purposes of recording or playing. Because of the requirement that the flexible tape be engaged by a head, precision of alignment and spacing of the tape relative to the head and protection of the tape during transport does not constitute a major problem. There exist numerous situations in which it would be advantageous to have a small portable viewing apparatus for microfilm that is housed within a cassette. For example, books could be microfilmed and stored in cassettes to form a library. A traveling salesman, or a mechanic, would not need to carry bulky catalogs and instruction manuals if the printed matter of such documents were stored in cassettes of microfilm, and if he had a small portable viewing apparatus for viewing selected frames of the film strip.

Thus, it is a major purpose of the present invention to provide a system for presenting written matter, such as documents, drawings or the like, on film strips enclosed in cassettes, and for providing a compact and inexpensive, but effective, viewer for reading microphotographs stored in cassettes.

It is another object of the present invention to provide a relatively small portable microfilm storing and viewing apparatus which can be easily carried from one place to another, is simple to construct and operate, and alleviates the need for carrying a burdensome amount of printed materials from one place to another.

It is a further object of the present invention to provide a cassette-stored microfilm system which can readily be used in offices and homes as well as at job sites, and which enables a large amount of printed matter to be stored in a small space without requiring the use of cumbersome apparatus for viewing the matter.

Another major purpose of the present invention is to provide in a storage cassette, for a film strip of microphotographs, features that operate to precisely align the microphotograph that is being viewed with the optical system of a viewer, and which protect the microphotographs on the microfilm strip from inadvertent scratching or damage.

And a further object of this invention is to provide a novel drive for the selective transporting of a recording strip or tape within a cassette.

Further object and advantages will become apparent from the detailed explanation of the invention that is provided in the following description and claims, and is illustrated in the accompanying drawings.

BRIEF DESCRIPTION OF THE DRAWINGS

FIG. 3 is an enlarged longitudinal cross-sectional view taken substantially along the line 3—3 of FIG. 1;

FIG. 4 is a fragmentary view showing the underside of the cassette-supporting platform, and is taken substantially on line 4—4 of FIG. 3;

FIG. 5 is a greatly enlarged cross-sectional view taken substantially on line 5—5 of FIG. 2 and showing features that cooperate with the cassette;

FIGS. 6 and 7 are greatly enlarged, fragmentary, longitudinal cross-sectional views, illustrating elements which effect changing the position of the lens means to vary the focus of the optical system;

FIG. 8 is an exploded perspective view of one form of cassette constructed in accordance with the principles of the present invention;

FIG. 9 is a front elevational view of a fragment of the assembled cassette of FIG. 8;

FIG. 10 is an enlarged, fragmentary, cross-sectional view taken substantially along line 10—10 of FIG. 9;

FIG. 11 is an enlarged, fragmentary, top plan view of a novel drive connection between the viewer and the cassette showing one of the driven hubs of the cassette surrounding a drive shaft, and wherein the shaft is rotating in a clockwise direction under influence of a controller;

FIG. 12 is a view similar to the view of FIG. 11 but showing the drive shaft rotating in the counterclockwise direction; And FIG. 13 is a fragmentary cross-sectional view taken substantially along line 13—13 of FIG. 12 to illustrate certain construction features of the hub relative to the drive shaft and cassette.

DETAILED DESCRIPTION OF THE ILLUSTRATIVE EMBODIMENT

Figure 1:
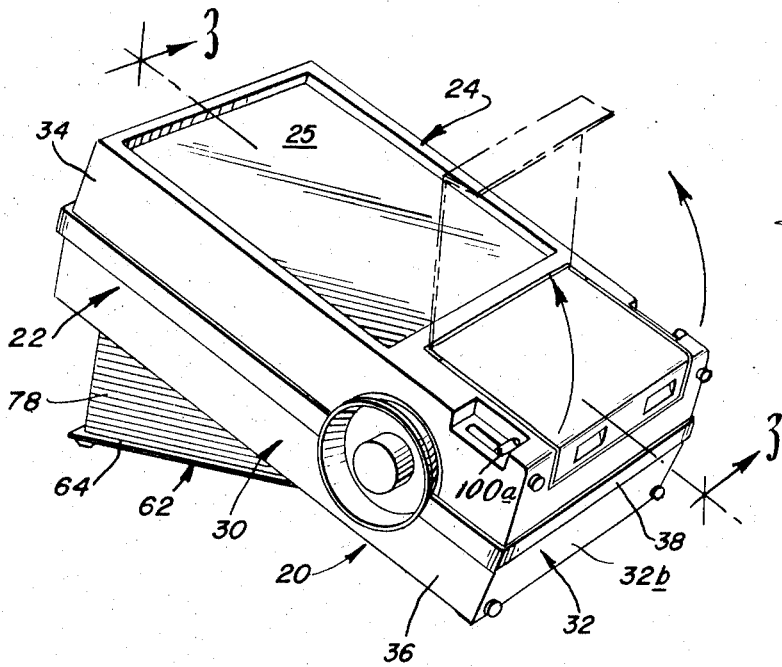
FIG. 1 is a perspective view of a microfilm viewer constructed in accordance with the present invention in its position of use and showing in phantom lines a cassette cover on the viewer in its raised, or open, position.

Referring now to the drawings, the microfilm viewer of this invention, generally indicated at 20, includes a casing means, or housing, 22 that is generally of rectangular box-like shape to provide upper and lower elongated sides, respectively, 24 and 26, that are spaced apart by side and edge portions, respectively, 30 and 32 to bound an elongated chamber 28 having distal and near ends adjacent, respectively, casing ends 32a and 32b. The precise construction of the respective walls and sides of housing means 22 is not critical, but in one preferred form it is proposed to provide same by two dished shell sections 34 and 36, molded of plastic and joined at their edges by an extruded joint 38 that provides peripheral recesses for receiving thereinto the edges of the shells, as indicated in FIG. 3, and also provides an inwardly-extending peripheral rib 39 to serve as a support where needed.

A major portion of the length of the casing's upper side 24 is occupied by viewing screen means, generally 25, that includes an outer, or upper, transparent plate 25a and a shorter, lower image-receiving-and-viewing plate 25b, that are held in position against an inturned edge 24a of side 24 by retainer 25c that are biased by screws 25d received in tapped studs 25e provided on the undersurface of the upper side 24. The lower plate 25b is a specially processed plate, as is known in the art, to serve as the screen against which the illuminated image is projected.

A first mirror 40 is provided in chamber 28 supported at an incline facing the lower side 26, by an angled mounting bracket 42 secured to rib 39. The lower edge of inclined mirror 40 is positioned closely adjacent the junction corner between lower side 26 and distal casing end 32a. The upper edge of mirror 40 is located outward of the distal edge of viewing screen 25b.

A support platform 44 is rigidly provided on casing 22 adjacent the casing's near end 32b by connectors including downturned flange 46 and out-turned rib 48. The platform 44 is located in chamber 28 between the near edge of viewing screen 25b and the casing's near end 32b, so as to leave the remainder of chamber 28 unobstructed for the purposes of the optical system of the viewer.

Mounted on platform 44 are spaced illuminating means 50 and lens means 54. A U-shaped cassette 52 with a microphotograph holding bight portion is located between the illuminating means 50 and the lens means 54. Beneath the platform 44 are a drive means for effecting selective transport of film within the cassette 52, a cassette-release means hereinafter described, and a control for selectively adjusting the position of the lens means 54. Spaced above platform 44 is a movable cover member 56 that is pivotally mounted adjacent one end at 58 and has a downturned edge 60 that is adapted to abut the upper side of rib 48 when the cover is closed.

The foregoing arrangement aligns the illuminating means 50, the microphotograph in cassette 52, and the lens means 54 so as to direct an enlarged illuminated image against the first mirror 40 in the manner as illustrated by the projection arrows seen in FIG. 3.

The housing's lower side 26 includes a stand-and-mirror means, generally 62, having an elongated stand member 64 pivoted adjacent its near end on pins 66 for movement between a stored position substantially in the plane of lower side 26 and an angled support position seen in FIG. 3. When in the angled support position with the far end of stand 64 and the near lower corner of the housing 22 engaging a horizontal support surface, the viewing screen 25b is located at an inclined attitude, as in FIGS. 1 and 3, convenient for scanning. The distal end of stand member 64 carries a latch member 68 that connects by pivot pin 70 to a manual control 72 to provide means to latchingly engage portion 26a of the lower side 26 when stand 64 is stored away. The distal end of stand 64 carries a pair of upstanding latches 74 spaced to straddle mirror 40 when in stored away position and of a selected length to locate stand 64 at a precise angle by tongue portions 74a engaging shoulder 26b. The stand 64 carries on its inner or upper side a second elongated mirror 76 which is of a selected dimension to receive the entire image reflected from first mirror 40 and to project an enlarged reflection against the viewing screen 25b.

Three edge portions of stand 64 that are exposed when stand 64 is angled and that surround mirror 76 carry a pair of upright longitudinal light shields 78 and an upright end shield 80. The length of said lightshields is, as shown in FIG. 3, such as to be accepted in chamber 28 for storage and to extend at least to side 26 when the stand is angled, so as to inhibit intrusion of random light to chamber 28. An additional upright light shield 82 is provided in chamber 28 positioned forwardly of platform 44 and outwardly of the near end of viewing screen 25b, and is of a size to shield mirror 76 from random light produced by illuminating means 50. The shield 82 is apertured at 84 to permit optical projection therethrough of an illuminated image from lens means 54.

Figure 2:
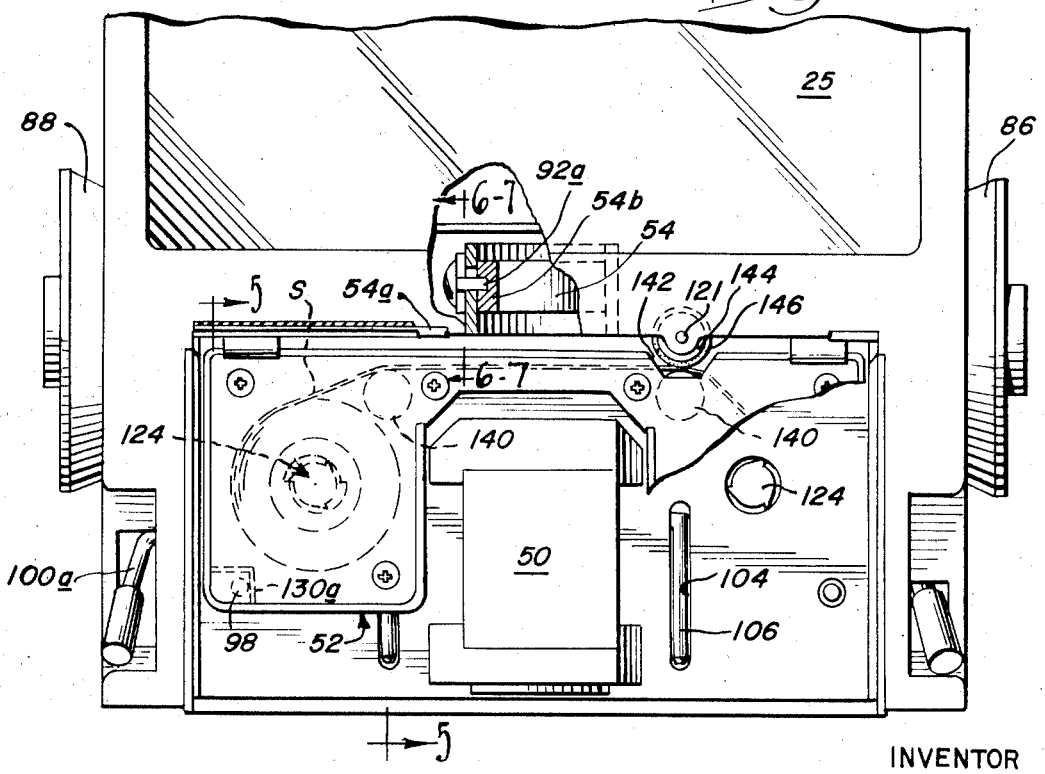
FIG. 2 is an enlarged, fragmentary top plan view with portions partially broken away, showing the cassette-receiving portion of the microfilm viewer of FIG. 1.

The viewer 20 is provided with similar rotatable controllers 86 and 88 located respectively adjacent the lateral edges of the casing on the right and left as seen in FIG. 2 and, respectively, arranged for selectively varying the focus of the projected image on screen 25b and for controlling and effecting transporting of the film strip in cassette 52. As seen in FIGS. 6 and 7, the lens means 54 includes an elongated, channeled support 54a that is rigidly secured to platform 44, so that the guide channel in which the movable lens cartridge 54b is slidable lies precisely parallel to the upper surface of platform 44. Movement of lens cartridge 54b is selectively effected through a control lever 90 having a short arm 92, extending upwardly of fulcrum pin 94 that is secured on platform 44, and a long arm 96 extending below platform 44. The short arm 92 connects by drive pin 92a to the lens cartridge 54b. The long arm 96 provides an elongated slot 96a that receives therein a driver pin 96b which projects eccentrically from the end of rotatable shaft 86a that is directly rotated by the controller 88.

It is important that the microphotograph that is to be projected and enlarged by the optical system be located within cassette 52 with precision relative to the lens cartridge 54b, because the optical system of the viewer is fundamentally an enlarger that operates to greatly magnify any distortions that may exist by reason by lack of precision. Thus, the lens cartridge 54b is movable, by reason of the foregoing construction, only longitudinally along the support 54a, and by structure now to be described the microphotograph that is to be projected will be located in the plane that is precisely perpendicular to the longitudinal axis of the lens means 54b.

The cassette 52 has a flat underside which is adapted to engage the upper surface of platform 44. In order to precisely position the microphotograph in cassette 52 square to, or perpendicular to both platform 44 and to the optical axis of lens 54b, the platform 44 is provided with a pair of abutment posts 98 perpendicular to the upper surface of platform 44 and adapted for engagement with portions of cassette 52. To insure that portions of cassette 52 are rigidly in abutment with platform 44 and upstanding abutment posts 98, a pair of spaced spring means 99 are provided carried by platform 44 and spaced from the posts 98. Each spring means 99 includes upstanding resilient arm 99a having a downwardly inclined portion 99b that projects towards parts 98, and a down-turned and turned back cam section 99c, as best seen in FIG. 5. The arm 99a is of greater height than the height of the cassette 52. The spring means 99 operates to impose a spring force that biases the cassette 52 firmly both longitudinally of platform 44 toward post 98 and toward the upper surface of platform 44.

A means for releasing cassette 52 from abutment against posts 98 and the bias of spring means 99 is provided by an elongated fulcrum bar 100 which is shaped at one end to provide an angled actuator 100a that extends to a position where it may be manually manipulated by an operator. The fulcrum bar 100 is pivotly held against the underside of platform 44 by a strap-type journal retainer 102. A pair of apertures 104 are provided through platform 44 beneath portions of the cassette 52, so that a pair of levers 106 may be thrust upwardly through such apertures to effect movement of cassette 52 to a release position as illustrated in FIG. 5. The levers 106 are arms of a U-shaped member whose bight 106a is offset from the pivot axis of fulcrum bar 100, so that said bight is positioned to move against the spring bias of a resilient return strap 108 mounted on the underside of platform 44. The spring 108 engaging bight 106a operates to normally restore the levers 106 to their normal position shown in broken lines in FIG. 5 when actuator 100 a is released.

The microphotograph that is to be optically projected, by the structure hereinabove described, is carried by the cassette 52. In the preferred construction, the microphotograph being projected is only one of a series of microphotograph frames that are printed on an elongated film strip. Means are provided by the viewer and cassette for transporting the film strip within the cassette 52 so as to permit an operator to select the microphotograph that is to be projected. The cassette itself must be constructed to present the microphotograph at an attitude that is precisely perpendicular to the optical axis of the lens cartridge 54b for purposes of proper, undistorted, projection. What will now be described are the means for effecting transport of film within a cassette that is removably mounted relative to control means carried by the viewer, and the features of construction of the cassette itself that are provided for protectively storing and transporting the film strip, and for presenting a microphotograph of the film at the desired attitude for projection.

The drive means for effecting transport of film within the cassette 52 includes rotatable controller 86 that is provided for rotating a pair of spaced shafts 110 and 112 which extend through platform 44 and provide cassette-engaging portions at their upper ends. The controller 86 rotates a shaft 86a upon which is mounted a toothed drive wheel 114. A toothed, endless, flexible drive belt 116 is trained over drive wheel 114 and drivingly cooperates successively with: toothed wheel 118 that rotates with shaft 110, toothed wheel 120, toothed wheel 122 which rotates with shaft 112, toothed idling wheel 123 rotatable on shaft 110, and back to wheel 114. The shafts 110 and 112 are journaled in platform 44 for rotation. The wheel 120 may serve as an idling wheel, or alternatively may rotate a shaft 121 upon which is mounted a roller for a purpose hereinafter noted.

The upper portions of shafts 100 and 112 are each provided with a drive bit 124 that is shaped, as in FIGS. 2 and 8–10, to provide three arcuately spaced shoulders 125 that extend radially outwardly, and a cam edge 126 associated with each shoulder 125. Each cam edge 126 runs from the outermost tip of one drive shoulder 125 to the root or innermost edge of the following drive shoulder 125. As best seen in FIG. 2, the drive shoulders 125 on the drive bit on shaft 112 face counterclockwise, while the drive shoulders 125 on the bit on shaft 110 face clockwise.

It will be understood that both drive bits 124 will rotate simultaneously in the same direction when the controller 86 is rotated, and that by rotating controller 86 in an opposite direction, the direction of rotation of the bits are reversed. This means that when controller 86 is rotated in one direction the drive shoulders 125 on drive shaft 110 are adapted for driving connection with a clutch element on the cassette, but when the controller 86 is rotated in the opposite direction, the drive shoulders 125 on drive shaft 112 operate to effect a driving connection in the opposite direction.

The film-carrying cassette 52 is a generally U-shaped body having two spaced, film-spool housing sections 52a interconnected by a bight section 52b through which film is transported. As shown in FIG. 8, the cassette 52 is preferably formed of a molded plastic construction that includes a hollow or dished lower body section 130 and a cover plate 132. The outer corner of each spool section 52a, distal from bight 52b, is provided with an aperture 130a that is adapted to receive therethrough one of the two abutment posts 98. The inner corners of each cassette section 52a overlies one of the apertures 104 through platform 44.

The spaced upper and lower walls of each film-spool section 52a have annular centering rings 130c and 132c thereon which project toward the opposite wall. The bottom wall has an entry aperture 130d with a flared entry 130e concentrically of ring 130c, for accommodating entry of a drive bit 124. The cover plate, as best seen in FIG. 11, is provided with a recess 132a to accommodate entry of the tip of bit 124.

A spool, a reel, 134 for storage thereon of a coil of film strip S is located in section 52a, and provides an annular outer section 134a on which film is wound and an inner section 134b of reduced height to fit between entering rings 130c and 132c. The inner circular periphery 134c of the outer section 134a is of greater diameter than the diameter of centering rings 130c and 132c, so that the outer section 134a of each reel 134 is spaced some distance outwardly of the centering rings on the housing sections, as can be clearly seen in FIG. 11. This arrangement permits of a generalized centering of the reel 134 by the centering rings 130c and 132c, but permits of radial movement of the reel 134 relative to the said centering rings on the housing. Such radial movement is essential to the operation of the over-running clutch construction which permits a drive bit 124 to be rotated without driving the reel 134 as is illustrated in FIG. 10.

The inner periphery of the spool 134 as is illustrated in FIG. 10.

The inner periphery of the spool 134 is provided with a shape 136 that is constructed for clutching or over-running cooperation with a driving bit 124. Thus, as seen in FIGS. 9 and 10, the periphery 136 includes three equally, arcuate, spaced radial shoulders 136a that are interconnected by cam surfaces 136b, each of said cams connecting the peak of one shoulder 136a with the root of a preceding shoulder 136a considering the direction in which the shoulders are to be driven.

The cassette 52 also provides means for positioning the film strips at a precise attitude perpendicular to the direction of optical projection. The film strip is desirably of 8 mm. width, and the microphotographs are printed or placed only in the central portion of the film strip, thereby leaving the longitudinal edges of the strip free to be engaged without effecting damage to the print. Cassette 52 provides an elongated channel 138 through the length of bight portion 52b. Channel 138 is of a height slightly greater than the 8 mm. width of the film strip. The bight 52b has a transverse window 53 therethrough which is of a selected size to fully expose the microphotograph frame on the film strip. As best seen in FIG. 12, channel 138 has spaced, elongated edge portions 138a and 138of limited width and a central portion 138b of greater width. The width of grooves 138a and 138c is of the order of the thickness of the 8 mm. film strip so that the edge portions of the film strip will just slide through said grooves. Such an arrangement provides substantial rigidity to the 8 mm. film strip as it passes through channel 138, and such imparted to the film strip by the sliding cooperation with said grooves insures that the microphotograph frame that is disposed in alignment with window 53 is maintained precisely flat, without buckling or rippling, and thus the microphotograph is presented at a perpendicular attitude relative to the direction of optical projection of the image.

Mounted within cassette 52 adjacent the junction of each section 52a with bight section 52b is an idling roller 140 over which the film strip is trained before passing through the run of channel 138. Such rollers 140 eliminate sharp turns for the film strip. The microphotographs are normally located on the side of the strip opposite the one that passes over rollers 140. If required, the rollers 140 that engage the film strip may have spaced rim portions which engage only the longitudinal edges of the film strip.

In an optional modification of the drive for the film strip, an additional drive roller may be provided to grippingly cooperate with one of the idling rollers 140. To this end an aperture 142 is formed on the front side of cassette 52 adjacent one of the idle rollers 140, and an auxiliary roller 144 carried on or driven by shaft 121 is provided to engage portions of the outer side of the film strip. To protect the microphotograph on the outer side of the film strip, the auxiliary roller 144 is provided with spaced upper and lower film-engaging rings 146, such as rubber O-rings, which resiliently engage the film strip adjacent its longitudinal edges to air in transporting the film.

In connection with the film strip S and the channel 138 through which it is transported, it will be noted that a standard thickness of film is 0.0065 inches. In one form of construction, the width of grooves 138a and 138c was selected to be about 0.009 inches, and the width of central portion 138b was selected to be about 0.024 inches.

Although the drive for transporting the film is disclosed to be manual, it will be appreciated that a simple motorized drive for shaft 86a could be provided by means of a reversible electric motor that connects to shaft 86a through a speed reducing gear train, or the equivalent, and the direction of rotation of the motor could be controlled through a simple three-position toggle switch having opposite direction drive positions and an "off" position.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a viewer that includes means for projecting an illuminated microfilm frame against enlarging reflector means for display onto a viewing screen, the improved arrangement of a portable and compact viewer comprising, in combination: casing means defining spaced upper and lower elongated sides that in part bound an elongated chamber, the upper side including an elongated viewing screen, the ends of said viewing screen being spaced from the ends of the upper side, a first reflector mirror fixedly mounted on said casing means within the confines of the elongated chamber adjacent one end of said chamber, a support platform rigidly mounted on said casing means within the elongated chamber adjacent the other end of the chamber, said first mirror and platform being located outwardly of the projected confines of the ends of the viewing screen, means on the support platform for holding in optical alignment, and at pre-selected spacing, illuminating means, a microfilm frame, and lens means at an attitude for enlargingly projecting an illuminated microfilm frame through the elongated chamber between the upper and lower sides of the casing and against said first mirror, stand means pivotly secured to the lower side of the casing and movable between a stored-away position, that is located substantially in the plane of the lower side, and a deployed position, a second reflector mirror fixedly mounted only on said stand and positioned at an angle and attitude to receive the illuminated enlarged reflection from the first mirror and to project a further reflection onto the viewing screen when the stand is deployed to project transversely of the plane of the lower wall, said stand also cooperating with a portion of the casing to provide an angled support that, when disposed on a horizontal surface, locates the viewing screen at an inclined attitude convenient for scanning.

2. A construction as in claim 1 wherein the microfilm frame is part of a film strip of microphotographs that is housed within a cassette, and wherein the upper wall of the casing includes a movable cover member that affords access to said platform to permit selective removal and insertion of a cassette.

3. A construction as in claim 2 including controls positioned outwardly adjacent the lateral edges of the casing for effecting selective control of movement of the microfilm within the cassette and for varying the focus of the lens means.

4. A construction as in claim 1 including means for substantially shielding both the interior of the casing means and the second mirror from intrusion of random light when the stand is deployed in transverse position to the lower side of the casing means to provide said angled support for the viewer, said means comprising the stand being of greater size than the mirror and having peripheral portions located outwardly of the edges of the mirror, light-shield members carried on the peripheral portions of the stand adjacent the three edges of the mirror that are exposed outwardly of the casing when the second mirror is pivoted to its operative position, and a light-shield member mounted within the chamber and positioned between the illuminating means and said second mirror.

5. A construction as in claim 1 including latch means engaging the casing means and stand means for maintaining the stand means in its operative position.

6. A viewer construction as in claim 1 wherein the microfilm frame is part of a film strip of microphotographs that is housed within a cassette, and spaced elements on said platform including abutment means and spring means with portions spaced from the abutment means and from the platform for biasing the cassette both against the abutment means and against the platform to precisely optically locate the microfilm in the cassette relative to the lens means.

7. A viewer construction as in claim 6 including means for selectively releasing the cassette from said spaced elements including an aperture in the platform over which the cassette is to be positioned, and movable lever means including a part that may be moved through the aperture in the platform to force a cassette to disengage from operative engagement by said spaced elements so as to permit selective removal of the cassette from the viewer.

8. A viewer construction as in claim 1 wherein the microfilm frame is part of a film strip of microphotographs that is housed within a cassette, and there being film locating means on the cassette and one the casing means for precisely spacing a microphotograph that is to be viewed relative to the lens means, said film locating means including abutment surfaces on the platform arranged at a pre-selected angle to each other, the cassette having portions thereof adapted to engage said abutment surfaces to hold the cassette at a precise attitude, means forcing the cassette against the said abutment surfaces, and means within the cassette for holding the microphotograph that is to be viewed at a precise attitude.

9. A construction as in claim 8 wherein the cassette has a transverse window with which the microphotograph is to be aligned for purposes of illuminating and projection of the illuminated picture therefrom, and the cassette being shaped to provide an elongated channel that intersects the transverse window through which the central portion of the film strip within the cassette is caused to pass, and spaced parallel guide grooves located in a single plane and of a width and spacing to engage the opposite sides of the film strip adjacent the longitudinal edges of the film to prevent the portion of the film that is aligned with the window from departing from a planar attitude, whereby said portion of the film strip aligned with the window is held at a precise attitude relative to the optical system of the viewer.

10. A construction as in claim 1 whereby the lens means includes an elongated channeled member rigidly mounted on the platform, optical lens means slidably positioned in the channel of said channeled member, and a control lever operatively associated with the lens means for varying the position of the lens means along the channeled member.

11. A construction as in claim 10 wherein the control lever includes a short arm and long arm, the long arm being operatively connected to a manual controller, and the short arm being operatively connected to the lens means so as to provide for precision movement of the lens means.

12. A construction as in claim 1 wherein the microfilm frame is part of a film strip of microphotographs that is housed within a cassette, and separable drive means on the viewer and cassette for selectively transporting the film strip in the cassette in opposite directions to permit of selection of a desired microfilm frame on the film strip for projection on the viewing screen.

13. A construction as in claim 12 wherein the separable drive means include a pair of spaced drive shafts on the viewer having drive elements thereon that are arranged to be operative when rotated in opposite directions, a single controller on the viewer movable in opposite directions to selectively cause the drive shafts to rotate simultaneously either clockwise or counterclockwise, and driven elements on the cassette operatively associated with the film strip and arranged for cooperative engagement with the drive elements to move the film strip longitudinally within the cassette in one direction when the controller is moved in one direction and to move the film strip in the other direction when the controller is moved in the opposite direction.

14. A construction as in claim 1 including means for substantially shielding both the interior of the casing means and the second mirror from intrusion of random light when the stand is deployed in traverse position to the lower side of the casing means to provide said angled support for the viewer.

* * * * *